Sept. 12, 1961 A. ALFORD Re. 25,035

APERIODIC DIRECTIVE ANTENNA

Original Filed May 5, 1954

INVENTOR.
ANDREW ALFORD
BY
Ezekiel Wolf, Wolf & Greenfield.
ATTORNEYS

United States Patent Office

Re. 25,035
Reissued Sept. 12, 1961

25,035

APERIODIC DIRECTIVE ANTENNA

Andrew Alford, Winchester, Mass.
(299 Atlantic Ave., Boston, Mass.)

Original No. 2,910,694, dated Oct. 27, 1959, Ser. No. 427,690, May 5, 1954. Application for reissue Oct. 21, 1960, Ser. No. 64,233
13 Claims. (Cl. 343—732)

Matter enclosed in heavy brackets [ ] appears in the original patent but forms no part of this reissue specification; matter printed in italics indicates the additions made by reissue.

The present invention relates to ultra high frequency radiating structures and in particular to structures having a directional pattern of a main lobe in a described direction.

In the present invention, the desired directivity is obtained by a series of substantially aligned loops fed by a transmission line in such a manner that the delay in the transmisison line is such that the energy adds in the same phase in the desired direction of propagation for all the loops which are fed.

Array structures of dipoles and stub antennas have been fed by transmission line to form a pattern of a directive lobe, but in such cases not only is the frequency very critical, but the desired directive lobe is not achieved.

The present invention is applicable to high frequency radio transmission and reception in the television range and finds particular application to ranges from 300 megacycles upwards, wherein the loops may be made from 30 to 27 inches in diameter and even less at the higher frequencies.

One feature of the present invention is that the dimensions of the loop and the spacing along the line is for the most part not critical and a considerable frequency band will be accommodated. A design for 300 megacycles will work substantially with effectiveness at 200 and 500 megacycles. The structure has recommended band width of about 1.7 to 1.

In the present invention, the transmission line may be a coaxial transmission line. Across the line are connected a series of loops with preferably the midpoint of the loop in a neutral plane between each side of the line. In this way the power absorbed by each loop will be approximately correct so that the entire series of loops may together absorb a substantial power from the line.

If the loops are connected at their mid-point to the opposite line, then too much power will be drawn from the line and much fewer loops can be efficiently fed, whereas when the loop is connected with the mid-point in a neutral position, a moderate amount of power is drawn so that a number of loops, six or more, may be connected along the line. The loop itself is substantially $\lambda/4$ long from one end to its neutral position, and therefore has a complete length of about $\lambda/2$.

In the table given below, a line of 300 ohms was used with the impedance of each loop 3000 ohms spaced 45° apart along the line. The resultant values are the power at each loop.

| Loops | 1st | 2nd | 3rd | 4th | 5th | 6th | 7th | 8th | 9th | 10th | 11th | 12th | 13th | 14th |
|---|---|---|---|---|---|---|---|---|---|---|---|---|---|---|
| | .9 | .81 | .725 | .657 | .592 | .534 | .480 | .432 | .390 | .351 | .316 | .284 | .256 | .230 |

It will be seen from these figures that about half the power was used up by the first six or seven loops but that effectively a considerable more number of loops would be used.

With a line up to $3\lambda$ or three-wave lengths long at the operating frequency, it was also found that the velocity of propagation along the transmission line could vary considerably from 1.2 to .7 times the velocity of light with a reasonably good radiation pattern, and at two wave lengths long, good patterns were obtained from $V=1.2$ to $V=.6$ the velocity of light.

It may also be noted that for preferable operation 50% to 60% of the energy is taken out of the line and that the rest will be absorbed in the terminating resistor.

A further advantage of making the loop $\lambda/2$ across the line in the vicinity of the mean frequency band, is that it appears as resistive and does not change the natural phase of transmission along the line to any appreciable extent.

The loops may overlap along the line and in fact may be spaced as close as $\lambda/8$ along the line, where $\lambda$ is the free space wave length of a frequency within the propagating band.

Various constructions of the line will be possible without departing from the spirit of the invention as will be evident from the specification set forth below when taken in connection with the drawings, in which.

Figure 1:
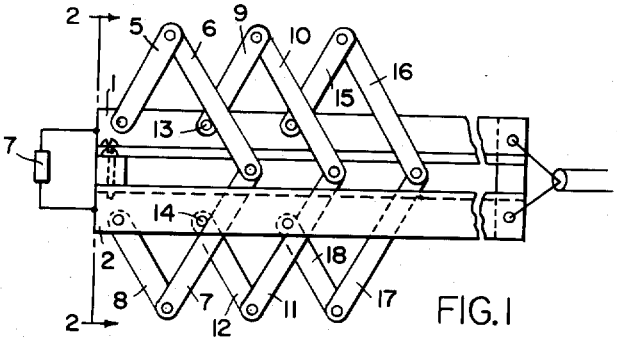
FIGURE 1 shows somewhat diagrammatically one view of the invention.
Figure 2:
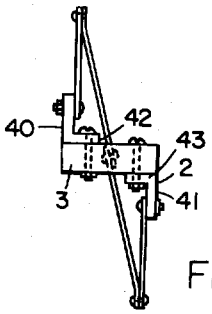
FIGURE 2 shows the invention of FIGURE 1 on section 2—2 of FIGURE 1.

In the arrangement indicated in FIGURE 1, the line comprises two angle elements which form conductors 1 and 2 for the transmission line. These angle elements as indicated in FIGURE 2 have parallel upwardly and downwardly extending sections 40 and 41 and inwardly extending sections 42 and 43 which are parallel to one another in offset planes. Insulating plate or bars 3 are connected across each end of lines 1 and 2 to hold the structure together. The angle elements 1 and 2 may be of any conductive material but in order to make the line right they are preferably constructed of aluminum, while the end elements may be of any insulating material, suitable for the purpose.

A twin coaxial lead 5' is connected to the transmission line at the right and from this the inner and outer conductor connect respectively one to one side and the other to the other side of the line.

In FIGURE 1, the lines 1 and 2 have connected across them, a series of links 5, 6, 7 and 8, forming a loop across the line. The loop formed by the links 5, 6, 7 and 8 is preferably of a loop equivalent of a half wave length of some frequency in the band range for which the line is intended to be used. The junction of the links 6 and 7 is preferably at a neutral point across the line and each pair of links 5 and 6 and 7 and 8 are a quarter wave length long, with the spacing between the junction of the links 7 and 6 and the initial connection of the link 5 to the line being somewhat in the neighborhood of one-eighth of a wave length or perhaps less.

In the arrangement indicated in FIGURE 1, a successive series of inductive loops are connected across the angle elements 1 and 2 successively along the transmission line. The loop positioned next to the loop formed by links 5, 6, 7 and 8, is the loop formed by links 9, 10, 11 and 12. This loop may have its beginning in the lines 1 and 2 at a position before the junction of the loops 6 and 7 as indicated at the points 13 and 14. The loops may therefore overlap one another but are not in any way connected to each other and are so constructed that they are positioned clear of each other along the line.

The third loop comprising the links 15, 16, 17 and 18, and all of the successive loops of which there may be approximately nine or more in number are ranged in the same way along the line. The transmission line feed to the loops is from the closed end of the loop, that is to the right of the figure, as indicated in FIGURE 1. The open ends of the loops, that is between the links 15 and 18, 9 and 12, and 5 and 8, face away from the direction of the feed of the line. At the end of the line away from the feed there is placed a resistance 7' across the line which may be and preferably is equal to the surge or characteristic impedance of the line.

In the arrangement indicated in FIGURE 1 with the loops positioned across the line and the neutral point of the loops at the junction of adjacent pairs of loops, the loops draw a certain power from the line which is sufficient so that a greater percentage of the energy is drawn by the complete number of loops across the line.

A preferable arrangement for use for this purpose is to use nine or more loops across the line, in which case the energy drawn from the line will be a substantial amount.

Figure 7:
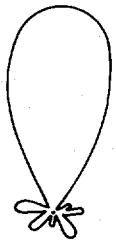
FIGURE 7 shows a beam pattern taken in the direction of propagation along the transmission line employing the present invention.

Propagation of the wave along the transmission line and the adjustment of the loops along the line at positions as indicated will provide a directive radiation in the direction of the line as plotted in FIGURE 7.

Figure 3:
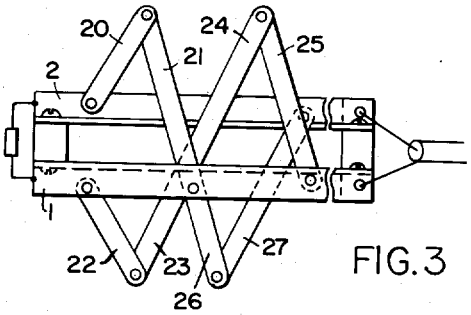
FIGURE 3 shows a variation of the arrangement shown in FIGURE 1.

A variation of the construction shown in FIGURE 1 is indicated in FIGURE 3.

In the arrangement indicated in FIGURE 3, the transmission lines 1 and 2 have connected across them, a series of loops formed by two links each respectively, as indicated by the links 20 and 21. These loops form a circuit across the line and may be opposed by corresponding loops formed by links 22 and 23, which begin from the other side of the line and extend to the first side of the line. The link 22, it will be noted is connected to the angle element 1 on one side of the line, while the link 23, is connected to the angle element 2 on the other side of the line. In effect, the four links, 20, 21, 22 and 23, form one complete loop, and successive loops are formed by a successive series of links 24, 25, 26 and 27. A number of these loops may be tied across the line in the same manner as the loops which have just been described. The chief difference between the line shown in FIGURE 1 and that shown in FIGURE 3 is that more power will be drawn from the line because of the positive connection across the line by the pairs of loops rather than connection across the line from a neutral point in the loops.

The arrangement in FIGURE 3 is also preferably fed by means of a coaxial cable twin conductor cable 50, one end 51 of which goes to one side 2 of the line and the other 52 of which goes to the side 1 of the line. The arrangement shown in FIGURE 3 is not in many respects as useful as that in FIGURE 1 because more power is drawn from the transmission line than the arrangement shown in FIGURE 1. However where fewer loops are to be used, an arrangement shown in FIGURE 3 may at times be preferable.

Figure 4:
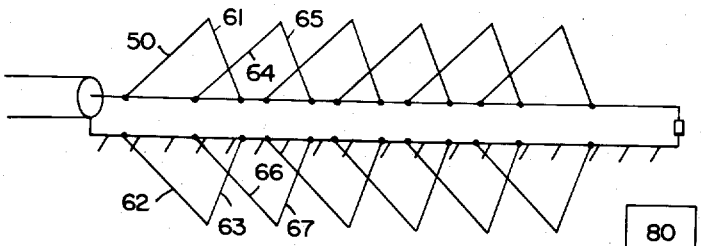

*Referring to FIG. 4, there is shown another embodiment of the invention is which the center conductor of a coaxial transmission line is brought out generally parallel to means defining a ground plane connected to the outer conductor of the coaxial transmission line. Conducting loops are shown longitudinally spaced along the center conductor extension with the image of these loops shown beneath the ground plane. The first two of the loops are formed by conducting legs 60, 61, 64 and 65 whose images are 62, 63, 66 and 67, respectively.*

Figure 5:
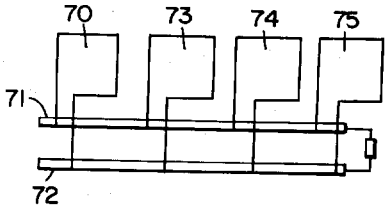
FIGURES 4, 5 and 6 show diagrammatically further variations of the invention illustrated in FIGURE 1.

As will be seen in FIGURE 5, it is *not* necessary that the loop may be formed in triangular form, but any form may suffice. In FIGURE 5 a rectangular form is shown in which a loop 70 has one terminal connected to one side of the line 71 and the other terminal connected to the other side of the line 72. The loops 70, 73, 74 and 75, and so on, may be arranged in series across the line and each may be designed to draw sufficient power, so that a directivity of the radiator as a whole will be in the direction of the extension of the line.

In each of the lines, a terminal resistance or impedance is used to prevent undue reflections back on the line.

Figure 6:
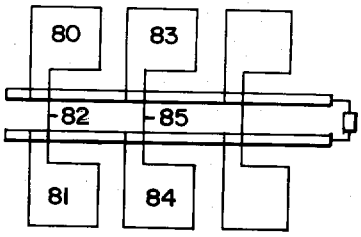

In the arrangement shown in FIGURE 6, the loops are connected across the line with one loop section 80 connected on one side of the line and the other loop section 81 connected on the other side of the line with the loops joined at a neutral point as indicated by the connecting line 82. A series of similar loops 83, 84, with the connecting line 85, and other successive loops as indicated in the drawings may be attached along the line to provide the necessary number of loops and phased radiation as the wave is transmitted along the line.

The purpose of the arrangement of the loops along the line is to provide radiation along the line in the direction of the line corresponding to the wave propagation along the line. The wave propagation in the direction of the line should therefore correspond to the phase adjustment of the propagation of the wave from one loop to the next loop in the direction of the line. If the propagation of the wave along the line is the same as the free space wave propagation between loops, then each loop will be phased correctly for directive propagation in the direction of the line.

FIGURE 7 shows the directivity pattern in the direction of the line of a series of loops connected to the line. It will be noted that the radiation pattern in FIGURE 7 is such that a substantially narrow beam is obtained in the direction of the line without any specific compensation and merely by properly spacing the loops along the line.

In the arrangement indicated in FIGURE 1, the spacing of the loops along the line should be an eighth of a wave length or less, so that the loops act more as a distributive load rather than as a lump load at points along the line. The load also should be pure resistive so that the transmission along the line may be the free space wave transmission in the air. Under these conditions the phasing of the loops in the direction of the line will be such that the radiated energy of each group is additive completely in the direction of the line and as a result radiation in the direction in the line will be a maximum.

The same arrangement should be made in the use of all the loops connected to the line. If such a system is followed, then the directivity in the direction of the line is very sharp and a good directive beam will be obtained for the broad frequency band.

While in FIGURE 1, the loops are made in the form of links, it is quite evident that other forms of loops may be used, either in rectangular as illustrated in FIGURES 5 or 6, or circular or other forms may be used.

Having now described my invention, I claim:

1. An aperiodic directive antenna comprising a transmission line terminated in its characteristic impedance and formed of a pair of parallel conductors with a plurality of conducting links connected in parallel between said conductors to form radiating loops coupled thereto at spaced points along the transmission line, the plane of each loop being at an angle substantially less than 90° with respect to a line joining the loops, whereby the loops are progressively energized.

2. An aperiodic directive antenna comprising a transmission line terminated in its characteristic impedance and formed of a pair of parallel conductors with a plurality of conducting links connected in parallel between said conductors to form *radiating* loops *with a perpendicular to the plane of the loops having a component which is perpendicular to the length of the line, said loops* [with the plane of the loops positioned substantially in the plane parallel to the line and] coupled at spaced points along the transmission line, whereby the loops are energized in progressively delayed phases.

3. An aperiodic directive antenna comprising a transmission line terminated in its characteristic impedance and formed of a pair of parallel conductors with a plurality of conducting links connected between said conductors in parallel to form loops with the plane of the loops positioned substantially parallel to the plane of the line and coupled thereto at spaced points along the transmission line, said loops being substantially $\lambda/2$ where $\lambda$ is a wave length corresponding to a frequency in the band of reception or transmission and are spaced along the line at distances corresponding to less than $\lambda/4$ from one another.

4. An aperiodic directive antenna comprising a transmission line terminated in its characteristic impedance and formed of a pair of parallel conductors with a plurality of conducting links connected in parallel between said conductors to form loops with the plane of the loops aligned generally in the direction of the transmission line, said loops being spaced at a distance $\lambda/8$ apart, where $\lambda$ is the wave length corresponding to a frequency in the band of reception or transmission, said loops being substantially $\lambda/2$ long.

5. An aperiodic directive antenna comprising a transmission line terminated in its characteristic impedance and formed of a pair of parallel conductors, a plurality of loops positioned generally in the plane of the line, with the loops connected between said conductors at uniform spacing, said loops each being a half wave length long, said line with said loops connected thereto having a propagation velocity corresponding to the free space velocity of electromagnetic waves.

6. An aperiodic directive antenna comprising a transmission line terminated in its characteristic impedance and formed of a pair of parallel conductors, a plurality of conductive links connected in parallel from one conductor to the other, each forming a ¼ wave length loop and a second set of conductive links connected from the points of connection of said other conductor to said one conductor also forming ¼ wave length loops, said loops being placed along said line and positioned generally in the plane of the line, with the loops spaced at a distance corresponding approximately ⅛ wave length as measured by the free space wave length of a frequency within the operating band.

7. An aperiodic directive antenna comprising a transmission line terminated in its characteristic impedance and formed of a pair of parallel conductors, a plurality of conductive links connected in parallel together from one conductor to the other, each loop generally positioned in the plane of the line and being a quarter of a wave length long corresponding to frequencies in the operating band, said line with said links connected thereto having a propagation velocity corresponding to the free space velocity of electromagnetic waves.

8. An aperiodic directive antenna comprising a transmission line terminated in its characteristic impedance and formed of a pair of parallel conductors, a plurality of conductive links connected in parallel from one conductor to the other, forming a series of half wave length loops spaced along the length of said transmission line generally positioned in the plane of said line and operating at a frequency within the operating band, with the mid-points of each loop positioned at a neutral point between said conductors, said line with said links connected thereto having a propagation velocity corresponding to the free space wave velocity of electromagnetic waves.

9. An aperiodic directive antenna comprising a transmission line terminated in its characteristic impedance and formed of a pair of parallel conductors, a plurality of conductive links connected in parallel from one conductor to the other, forming a series of spaced radiating and receiving loops arranged substantially coplanar in a plane substantially parallel with the transmission line on the transmission line, said line having a propagation velocity between 1.2 and .6 of the velocity of light in free space.

10. An aperiodic directive antenna comprising a transmission line terminated in its characteristic impedance and formed of a pair of parallel conductors, a plurality of conductive links connected in parallel from one conductor to the other, forming together a series of spaced radiating and receiving loops arranged substantially coplanar in a plane substantially parallel with the transmission line on the transmission line, said line having a propagation velocity between 1.2 and .6 of the velocity of light in free space, said loops being spaced along the line at distances apart substantially no greater than $\lambda/4$ where $\lambda$ is the wave length corresponding to a frequency in the operation band of transmission or reception.

11. An aperiodic directive antenna as in claim 10, in which the transmission line has no fewer than six loops connected across it.

*12. A directive antenna comprising, first and second generally parallel conductors forming a transmission line having a predetermined characteristic impedance, means for terminating one end of said transmission line in its characteristic impedance, the other end of said transmission line being arranged to accept energy for transmission toward said terminated end, and a plurality of radiating conducting loops coupled to said transmission line between said ends at spaced points along the length of said line, the impedance presented by each loop to said line where coupled thereto being greater than said characteristic impedance, the respective normals to the planes of each loop including a component perpendicular to the length of said line.*

*13. A directive antenna in accordance with claim 12 wherein one of said conductors defines a ground plane, and each of said conducting radiating loops is connected between spaced points along the length of the other of said conductors, said loops being imaged in said ground plane.*

References Cited in the file of this patent or the original patent

UNITED STATES PATENTS

| | | |
|---|---|---|
| 1,562,961 | Heising | Nov. 24, 1925 |
| 1,747,008 | Jacobson | Feb. 11, 1930 |
| 2,145,024 | Bruce | Jan. 24, 1939 |
| 2,247,744 | Bohm | July 1, 1941 |
| 2,366,195 | Kandoian | Jan. 2, 1945 |
| 2,622,196 | Alford | Dec. 16, 1952 |

FOREIGN PATENTS

| | | |
|---|---|---|
| 506,854 | Germany | Sept. 9, 1930 |
| 215,014 | Great Britain | Aug. 21, 1924 |